US011515797B2

(12) United States Patent
Waters

(10) Patent No.: US 11,515,797 B2
(45) Date of Patent: Nov. 29, 2022

(54) APPARATUS FOR DYNAMIC LEARNING OF VOLTAGE SOURCE CAPABILITIES

(71) Applicant: Texas Instruments Incorporated, Dallas, TX (US)

(72) Inventor: Deric Wayne Waters, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/214,181

(22) Filed: Mar. 26, 2021

(65) Prior Publication Data

US 2021/0218338 A1 Jul. 15, 2021

Related U.S. Application Data

(63) Continuation of application No. 16/597,385, filed on Oct. 9, 2019, now Pat. No. 11,101,736, which is a
(Continued)

(51) Int. Cl.
*H02M 3/335* (2006.01)
*G06F 1/26* (2006.01)
(Continued)

(52) U.S. Cl.
CPC ........ *H02M 3/33507* (2013.01); *G06F 1/266* (2013.01); *H02J 13/00016* (2020.01);
(Continued)

(58) Field of Classification Search
CPC .................. G06F 1/266; H02J 13/0063; H02J 2007/0062; H02M 3/33507; H02M 3/33515; H02M 2001/0003
(Continued)

(56) References Cited

U.S. PATENT DOCUMENTS

| 5,884,086 A | 3/1999 | Amoni et al. |
| 6,091,617 A | 7/2000 | Moran |

(Continued)

FOREIGN PATENT DOCUMENTS

| CN | 101142534 A | 3/2008 |
| CN | 104781750 A | 7/2015 |

(Continued)

OTHER PUBLICATIONS

Search Report for PCT Application No. PCT/US16/44883, dated Nov. 3, 2016 (1 page).
(Continued)

*Primary Examiner* — Ji H Bae
(74) *Attorney, Agent, or Firm* — Ray A. King; Charles A. Brill; Frank D. Cimino

(57) ABSTRACT

A universal serial bus (USB) source device adapted to be coupled to a USB sink device via a USB cable, the USB source device including: a voltage bus (VBUS) terminal adapted to be coupled to a VBUS conductor of the USB cable; a configuration channel (CC) terminal adapted to be coupled to a CC conductor of the USB cable; a VOUT node coupled to the VBUS terminal and adapted to be coupled to a voltage supply; a controller circuit coupled to the VBUS terminal, the CC terminal and the VOUT node; a load circuit coupled to a discharge signal connection of the controller and to the VOUT node; and a resistor divider coupled to the VOUT node and the controller and adapted to be coupled to the voltage supply.

13 Claims, 5 Drawing Sheets

Related U.S. Application Data continuation of application No. 15/392,047, filed on Dec. 28, 2016, now Pat. No. 10,476,394.

(51) Int. Cl.
  *H02J 13/00* (2006.01)
  *H02J 7/00* (2006.01)
  *H02M 1/00* (2006.01)

(52) U.S. Cl.
  CPC .............. *H02J 7/00* (2013.01); *H02M 1/0003* (2021.05); *H02M 3/33515* (2013.01)

(58) Field of Classification Search
  USPC .................................. 713/300, 340; 700/297
  See application file for complete search history.

(56) References Cited

U.S. PATENT DOCUMENTS

| | | | |
|---|---|---|---|
| 6,459,175 | B1 | 10/2002 | Potega |
| 6,952,748 | B1 | 10/2005 | Guerrero, Jr. et al. |
| 8,176,498 | B2 | 5/2012 | Huscroft et al. |
| 8,704,550 | B2 | 4/2014 | Seth et al. |
| 8,736,227 | B2* | 5/2014 | Chadbourne ........... G06F 1/266 320/114 |
| 9,170,914 | B2* | 10/2015 | Markel ............... G06F 13/4081 |
| 2005/0197094 | A1 | 9/2005 | Darshan et al. |
| 2006/0164062 | A1 | 7/2006 | Stineman et al. |
| 2009/0055672 | A1 | 2/2009 | Burkland et al. |
| 2009/0315467 | A1 | 12/2009 | Schindler et al. |
| 2010/0127568 | A1 | 5/2010 | Ng |
| 2010/0308783 | A1 | 12/2010 | Farley |
| 2012/0131357 | A1 | 5/2012 | Karam et al. |
| 2013/0290765 | A1 | 10/2013 | Waters et al. |
| 2014/0117970 | A1 | 5/2014 | Kitagaki |
| 2014/0136863 | A1 | 5/2014 | Fritchman et al. |
| 2014/0173141 | A1 | 6/2014 | Waters |
| 2014/0208134 | A1 | 7/2014 | Waters et al. |
| 2014/0320075 | A1 | 10/2014 | Baurie |
| 2015/0145324 | A1 | 5/2015 | Dwelley et al. |
| 2016/0043586 | A1 | 2/2016 | Wang et al. |
| 2016/0094071 | A1 | 3/2016 | Nge et al. |
| 2016/0163480 | A1 | 6/2016 | Lester |
| 2016/0254902 | A1 | 9/2016 | Nagase |
| 2016/0308452 | A1* | 10/2016 | Motoki ............. H02M 3/33523 |
| 2016/0349814 | A1 | 12/2016 | Carpenter, Jr. et al. |
| 2017/0031403 | A1 | 2/2017 | Waters |
| 2017/0115711 | A1 | 4/2017 | Jaramillo et al. |
| 2017/0205862 | A1* | 7/2017 | Gofman ................ G06F 13/426 |
| 2018/0309310 | A1 | 10/2018 | Kuo |
| 2019/0324510 | A1 | 10/2019 | Hijazi |

FOREIGN PATENT DOCUMENTS

| | | |
|---|---|---|
| CN | 105191039 A | 12/2015 |
| CN | 105629098 A | 6/2016 |
| EP | 1650401 A2 | 4/2006 |
| JP | WO2012060207 A1 | 5/2012 |
| WO | 2015119623 A3 | 8/2015 |

OTHER PUBLICATIONS

Search Report for PCT Application No. PCT/US2017/068650, dated May 4, 2018 (1 page).
CN Search Report Office Action for Pat. Appln No. 201780066105. 9, dated Sep. 7, 2021, 19 pages, CN.
CN Search Report for Pat. Appln. No. 201780066105.9, dated Jan. 27, 2021.
EU Search Report for Application No. 17887134.9 • 1201 / 3563517, dated Jan. 10, 2020.

* cited by examiner

APPARATUS FOR DYNAMIC LEARNING OF VOLTAGE SOURCE CAPABILITIES

CROSS REFERENCE TO RELATED APPLICATIONS

Under 35 U.S.C. § 120, this continuation application claims benefits of and priority to U.S. patent application Ser. No. 16/597,385 (TI-76490A), filed on Oct. 9, 2019 and to U.S. patent application Ser. No. 15/392,047 (TI-76490), filed on Dec. 28, 2016 and issued as U.S. Pat. No. 10,476,394, the entirety of which are hereby incorporated herein by reference.

BACKGROUND

Some interconnect specifications define a power delivery protocol in which a first device advertises its power delivery capabilities (e.g., voltages and currents) to a second device. The first device thus sources power and the second device sinks power. In some implementations, the power capabilities of the source device are hard-coded in a controller internal to the source device. The source device accesses its preset configuration and advertises those particular power capabilities to the sink device. The sink selects one of the advertised power capabilities and the source device configures its power source for the agreed upon power capability.

SUMMARY

In one embodiment, a system may include a power supply configurable to generate any of a plurality of output voltages on a power supply output node. The system also may include a voltage auto-detection power distribution (PD) controller coupled to the power supply. The voltage auto-detection PD controller may be configured to monitor an input signal for detection of presence of a device coupled to the system via a cable and assert combinations of a plurality of control signals. For each combination of control signals, the voltage auto-detection PD controller may measure a value of an output voltage from the power supply, store the measured value, and generate a plurality of packets for transmission to the device. Each packet contains a parameter indicative of a measured output voltage.

In another embodiment, a system may include a power supply, a power switch, a voltage auto-detection power distribution (PD) controller and a configurable resistor divider network. The power supply may be configurable to generate any of a plurality of output voltages on a power supply output node. The power switch may be coupled between the power supply output node and a voltage bus and may be configured to couple an output voltage from the power supply output node to the voltage bus. The voltage auto-detection PD controller may be coupled to the power supply and, via an enable signal, to the power switch. The voltage auto-detection PD controller may be configured to control the power switch to selectively be in an open state or a closed state. The configurable resistor divider network may be coupled to the voltage auto-detection PD controller. The voltage auto-detection PD controller may be configured to initiate a power supply output voltage learning mode upon detection of a sink device coupled to the system via a cable. During the power supply output voltage learning mode, the voltage auto-detection PD controller may be configured to use the enable signal to configure the power switch to an off state and assert combinations of a plurality of control signals to the configurable resistor divider network. For each combination of control signals, the voltage auto-detection PD controller may be configured to measure a value of an output voltage from the power supply and generate a plurality of packets for transmission to the sink device with each packet containing a parameter indicative of a measured output voltage.

In yet another embodiment, a method may include detecting attachment of a first device to a second device and iteratively configuring a power supply of the second device to produce a plurality of output voltages. For each iteration, the method may include measuring each output voltage and storing a value indicative of each measured output voltage. The method also may include transmitting communication packets to the first device. The communication packets may include the values indicative of the measured output voltages.

BRIEF DESCRIPTION OF THE DRAWINGS

For a detailed description of various examples, reference will now be made to the accompanying drawings in which.

DETAILED DESCRIPTION

Figure 1:
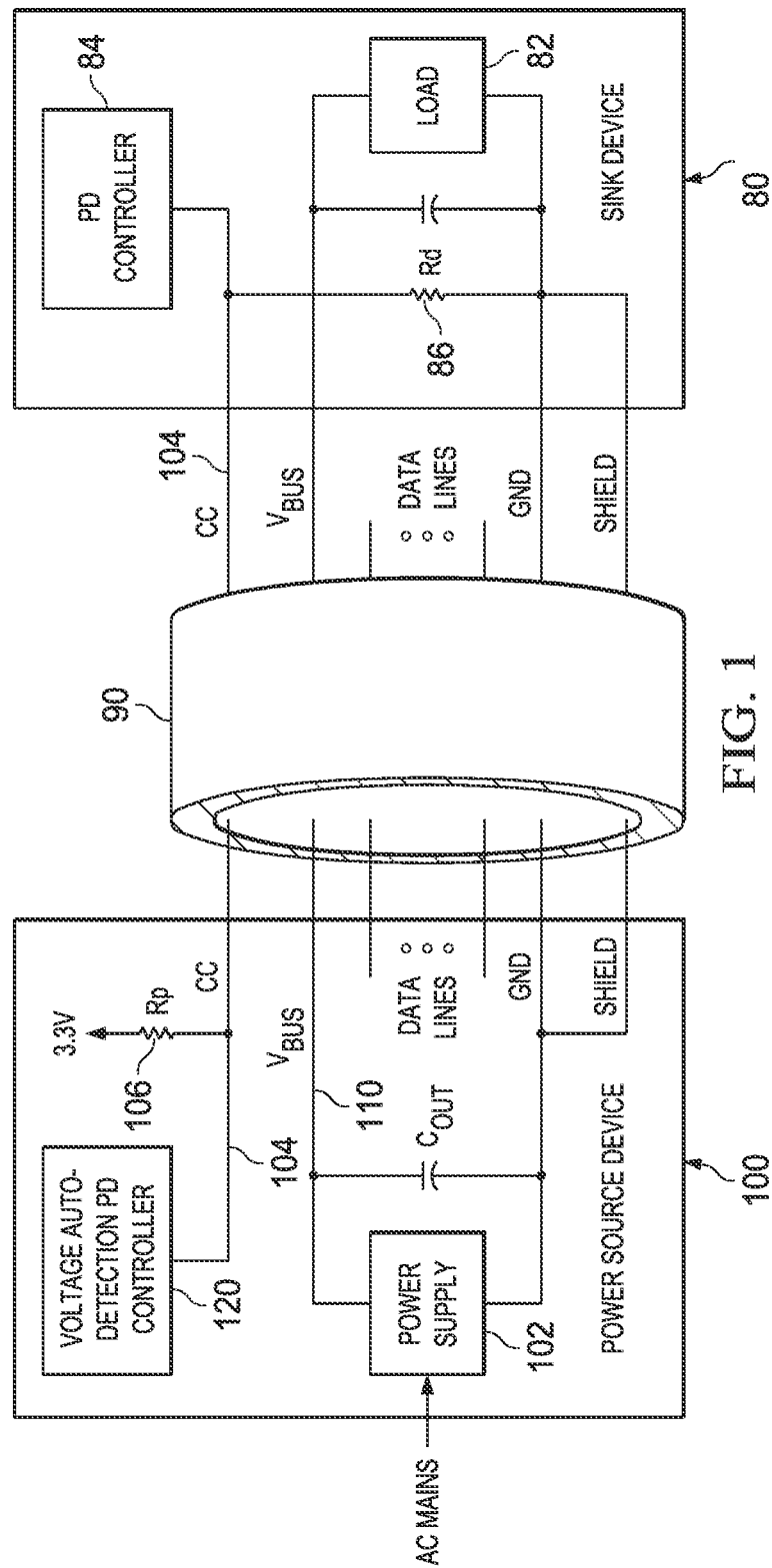
FIG. 1 shows an embodiment in which a power source device which includes a voltage auto-detection power distribution (PD) controller is coupled to a sink device over a cable in accordance with various examples.

Reference may be made herein to the Universal Serial Bus (USB) Power-Delivery (PD) and Type-C specifications, but such references are merely made for illustrative purposes and do not limit the scope of this disclosure and the claims. This disclosure is directed to other specifications as well. Various USB PD and Type-C specifications enable delivery of higher power levels over USB cables and connectors. This technology creates a universal power plug for laptops, tablets, etc. that may require more than, for example, 5V. The USB-PD specification, for example, defines a communication link between ports connected via a USB-PD cable. The communication may be half-duplex and packet-based. The communication packets contain information that enables the two ports to communicate and negotiate the voltage and current a source port will provide to a port. The underlying communication per the USB PD specification may be Biphase Mark Coding (BMC). Such communication happens independently from the normal USB communications that pass through the same cable, albeit on different wires. USB-PD communication packets flow over a different conductor (e.g., the control channel (CC) conductor) rather than the USB data conductors.

A power source device (sometimes referred to as a "source") may advertise its supply types in the form of power data objects (PDO) that are included in a USB PD message called a Source Capabilities message. Fixed-Supply PDO's contain a voltage and maximum current; Variable-Supply PDO's contain maximum voltage, minimum voltage, and maximum current; Battery-Supply PDO's contain maximum voltage, minimum voltage, and maximum power. A source device may advertise multiple unique PDO's. A sink device (sometimes referred to as a "sink") may request one of the advertised power capabilities via a USB PD message called a Request message. If the source can meet the sink's request the source sends an Accept message; otherwise the source may send a Reject or Wait message. Once the source has adjusted its power supply, the source sends a PS_RDY message to inform the Sink that the sink can begin sinking the power at the agreed up on level.

Before advertising its voltage capabilities, the source first detects that a sink has been attached by way of a cable or other connection mechanism. The source may include a pull-up resistor on the CC conductor. The sink includes a pull-down resistor or clamp on the CC conductor. The source detects the presence of the sink by measuring the DC voltage on the CC conductor. At one voltage level or range of voltages, the source determines that no sink is attached, and at a different level or range of voltages, the source determines that a sink is attached. The source then may verify that the voltage on the CC conductor stabilizes for a predetermined period of time (e.g., between 100 ms and 200 ms) for debounce purposes. Per the applicable specification, the source then applies a predetermined voltage (e.g., 5V) to the power wire (referred to as the voltage bus (VBUS) in the USB PD specification) of the cable within 475 ms. Then, after applying the predetermined voltage (e.g., 5V), the source may send communication messages advertising its source power capabilities (e.g., using the PDO's as described above), such as which voltages can be provided and the current level for each corresponding voltage.

Ina power supply output voltage learning mode, the source determines the voltages that the source's power supply can generate before the source can advertise the voltages to the sink. In accordance with the disclosed embodiments, a voltage auto-detection PD controller in the source dynamically learns the voltages the source's power supply can generate before advertising such power capabilities to the sink. In this embodiment, the power supply's power capabilities are not pre-configured into the source's PD controller. Instead, the power supply's power distribution capabilities are dynamically determined by a voltage auto-detection PD controller in the source. For a supply type that is characterized by a minimum and maximum voltage (and not simply multiple discrete voltage levels), the voltage auto-detection PD controller may control the power supply to reach its maximum and minimum voltages individually, and then advertises the voltage range. For a supply type characterized by a single voltage, power supply has multiple voltage settings, any of which can be used. The auto-detection PD controller in this case controls the power supply to reach each of its unique voltages, and then advertises those unique voltages.

FIG. 1 illustrates an embodiment of a power source device 100 coupled to a sink device 80 via a cable 90. The power source device 100 can generate and provide an operating voltage and current to the sink device 80, which uses the voltage and current provided by the power source device 100 to power a load 82 in the sink device. The load 82 may include any type of circuit(s) such as processors, memory, custom circuits, passive components, active components, etc. In some embodiments, the power source device 100 may comprise a power "brick" which is a power adapter that converts AC Mains power to a DC voltage and current for the sink device 80. In other embodiments, the power source device 100 may be, or may be part of, a compute device such as a computer, tablet device, etc. Further, the power source device 100 may be capable of dual mode operation, that is, either as a source device in which it generates power or a sink device in which sinks power generated by another device. For some implementations, the power source and sink devices 100 and 80 implement the USB PD and Type-C specifications, although other specifications and protocols may be implemented as well.

The power source device 100 includes a power supply 102, an output capacitor ($C_{OUT}$), a pull-up resistor 106 (which may be implemented as a current source integrated in an integrated circuit (IC) of the power source device), and a voltage auto-detection power distribution (PD) controller 120. The power supply 102 receives and converts the input AC Mains voltage to one more output DC voltages and currents and provides the output DC power to the sink device 80 via the voltage bus ($V_{BUS}$) 100. The voltage auto-detection PD controller 120 of the power source device 100 may interact with a PD controller 84 (which may be the same as or different from the voltage auto-detection PD controller 120) in the sink device 80 to negotiate which voltage level the power supply 102 is to generate and provide to the sink device 80. The power supply 102 may be capable of generating output voltages at any of multiple different levels (e.g., 5V, 9V, 15V, 20V, etc.). In various embodiments the power supply 102 may be capable of generating only a single output voltage, two different output voltages, three output voltages, etc. The voltage auto-detection PD controller 120 in the source device advertises to the PD controller 84 in the sink device 80 (e.g., by way of messages transmitted over a control channel (CC) conductor (e.g., wire, conductive trace, etc.) 104. The sink device 80 can select one of the advertised voltages, and the voltage auto-detection PD controller 120 responds by configuring the power supply 102 to supply the agreed upon voltage to the sink device 80. In embodiments in which the power supply is characterized by a voltage range capability between a minimum voltage and a maximum voltage, the sink device 80 can request a voltage between the minimum and maximum advertised by the voltage auto-detection PD controller 120.

In addition to be being used to transmit the communication packets during the power negotiation process, the CC conductor 104 may be used for an additional reason which is to permit the voltage auto-detection PD controller 120 to detect when the sink device 80 has been connected to the power source device 100 via, for example, a cable 90. The pull-up resistor 106 is coupled between the CC conductor 104 within the power source device 100 and a pull-down resistor 86 is coupled between the CC conductor 104 within the sink device 80. As such, the voltage level on the CC conductor will be at a higher level with no sink device 80 connected to the power source device 100 than if the sink device 80, with its pull-down resistor 86, is connected to the power source device via cable 90. The voltage auto-detection PD controller 120 thus can detect whether a sink device 80 is connected to it by monitoring the voltage level on the CC conductor 104.

As mentioned above, the power supply 102 may be capable of generating any of a number of different voltages. In accordance with the disclosed embodiments, the voltage auto-detection PD controller 120 performs a process by which the controller dynamically determines the particular voltage capabilities of the power supply 102 and advertises those particular voltages to the sink device 80. As such, the voltage auto-detection PD controller 120 need not be preconfigured for a particular set of voltages and thus can be used with a wide variety of power supplies. Further still, because the voltage auto-detection PD controller 120 learns the actual voltages that the power supply 102 can generate, the power supply 102 need not be designed for a particular precise voltage level. That is, when designing a power supply system, each actual power supply may have different characteristics which may cause its output voltages to be slightly different, but because the voltage auto-detection PD controller 120 measures the voltages the power supply can actually generate, design restrictions and tolerances may be relaxed for the power supply design.

Figure 2:
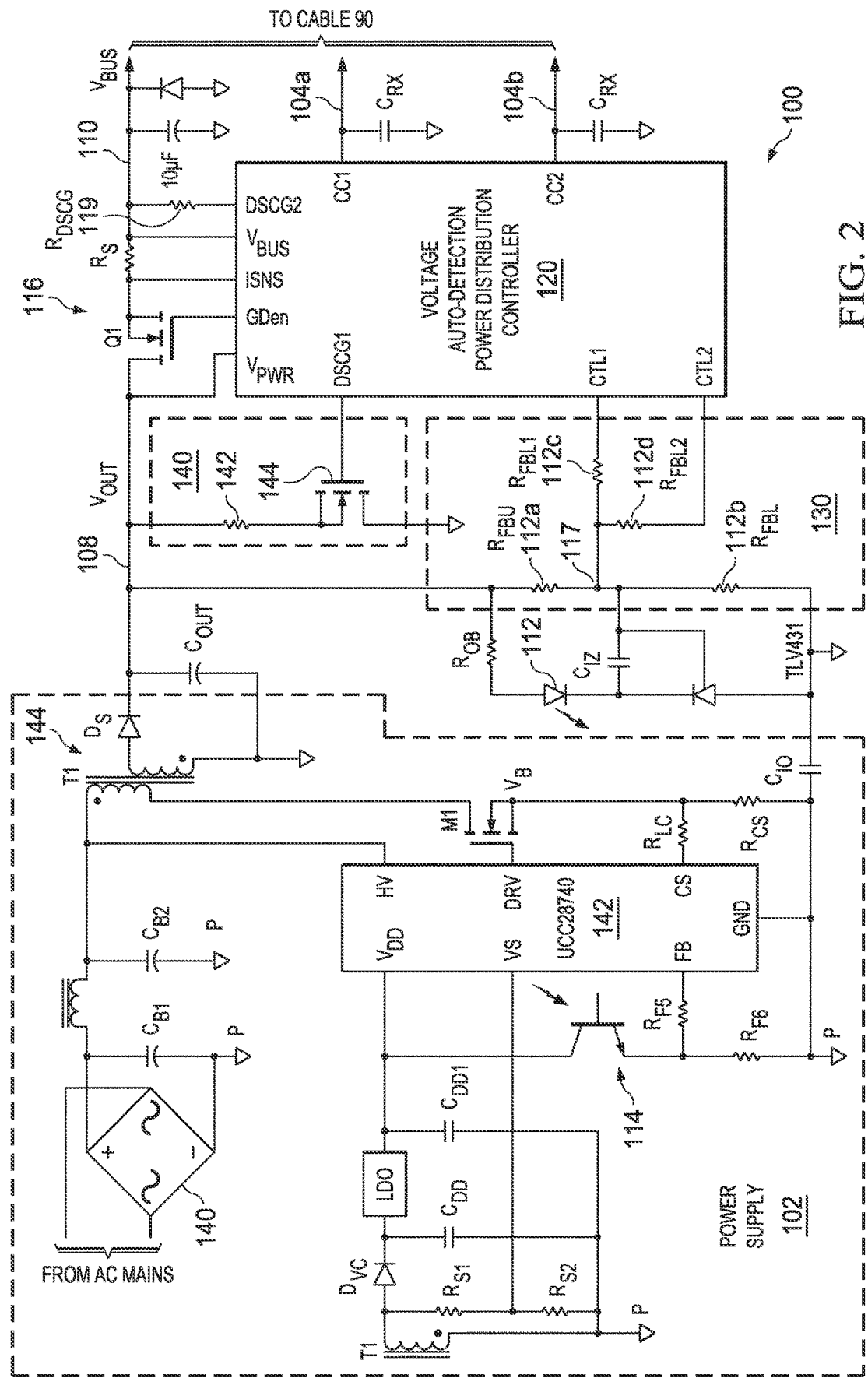
FIG. 2 shows an embodiment of the power source device of FIG. 1 in accordance with various examples.

FIG. 2 shows an example of a possible implementation of the power source device 100. The source device 100 includes various components coupled together as shown to form the power supply 102. Some of the components may include a bridge rectifier 140, an isolation transformer 144, and a constant-voltage, constant-current flyback controller 142. Various other passive components such as resistors, capacitors, etc. are shown as well. The bridge rectifier 140 rectifies the incoming AC Mains waveform. The flyback controller 142 provides a constant voltage using an optical coupler formed by photodiode 111 and photodetector 114.

The voltage auto-detection PD controller 120 is shown as having a pair of CC terminals labeled as CC1 and CC2. The connectors for cable 90 may be symmetrical meaning that the connector is not keyed and can thus be connected in either of two orientations. As such, there may be two CC conductors, and one is used depending on the orientation of which the cable is attached. The power supply 102 generates an output voltage designated in FIG. 2 as VOUT and is the voltage on node 108. Node 108 is the output node of the power supply 102 and couples to a power switch (e.g., field effect transistor Q1) 116. The power switch 116 may be controlled to be in an on (closed) state or an off (open) state by control signal GDen from the voltage auto-detection PD controller 120. Node 110 couples to the opposite terminal of the power switch 116 from node 108 and the voltage on that node is provided to the voltage bus (VBUS) and provided through the cable 90 to the sink device 80. When the power switch 116 is on, the voltage on VBUS is largely the same as the VOUT voltage.

The voltage auto-detection PD controller 120 may include an analog-to-digital converter (ADC) that may be used to convert either or both of the VOUT or VBUS voltages to a digital form. The VOUT voltage is provided to the voltage auto-detection PD controller 120 by way of the $V_{PWR}$ terminal and the VBUS voltage is provided to the $V_{PWR}$ terminal as shown.

A configurable resistor divider network 130 also may be included and coupled to the voltage auto-detection PD controller 120. In the embodiment of FIG. 2, the configurable resistor divider network 130 may include a pair of series-connected resistors coupled between the VOUT node 108 and ground. As shown, the resistors include resistor 112a ($R_{FBU}$) and resistor 112b ($R_{FBL}$). The node between resistors 112a and 112b is designated as resistor node 117. The voltage auto-detection PD controller 120 includes a pair of control terminals illustrated as CTL1 and CTL2 (and sometimes referred to as the CTL1 signal and the CTL2 signal). The configurable resistor divider network 130 also includes resistor 112c ($R_{FBL1}$) coupled to the CTL1 terminal of the voltage auto-detection PD controller 120 and resistor 112d ($R_{FBL2}$) coupled to the CTL2 terminal. The CTL1 and CTL2 terminals may be open-drain terminals. As such, the voltage auto-detection PD controller 120 can configure each CTL1 and CTL2 terminals to be open or grounded. If the CTL1 terminal is pulled low, then its corresponding resistor 112c is coupled in parallel with resistor 112b, thereby changing the resistance of part of the resistor divider network 130. If, however, the CTL2 is left open, then resistor 112c is left floating and thus effectively not included in the resistor divider network. The same is true for the CTL2 terminal—pulling CTL2 low causes its corresponding resistor 112d to be placed in parallel with resistor 112b; otherwise resistor 112d is not placed in parallel with resistor 112b. Each combination of control signals CTL1 and CTL2 may configure the configurable resistor divider network differently than other combinations of the control signals. In other embodiments, rather than a configurable resistor divider network, the power source device 100 may include programmable current sources to vary the amount of current in a controlled manner through resistor 112a. In other embodiments, the auto-detection PD controller may have a circuit capable of setting different reference voltages using, for example, a digital-to-analog converter (DAC).

Current flows from Vout, through the configurable resistor divider network 130 to ground. The magnitude of the current is a function of the equivalent resistance of the resistor divider network 130 and thus is a function of whether each resistor 112c and 112d is coupled in parallel with resistor 112b by operation of the CTL1 and CTL2 signals. By varying the amount of current through the resistor divider network 130 due to operation of the CTL1 and CTL2 signals, the voltage across resistor 112a can be varied and thus the current through the photodiode 111 can be varied. The intensity of the light produced by the photodiode 111 may be a function of the current through the photodiode. The light generated by the photodiode 111 is detected by the photodetector 114. Thus, the combination of the photodiode 111 and the photodetector 114 forms an optical feedback signal to the flyback converter 142. The flyback converter 142 uses the optical feedback signal to regulate its output voltage VOUT.

The power supply 102 may be capable of generating multiple different voltages and, for each such voltage, regulates VOUT to track the particular voltage based on the optical feedback signal from the photodiode 111. Further, the power supply 102 can be configured by the voltage auto-detection PD controller 120 through configuration of the CTL1 and CTL2 signals to produce a particular output voltage VOUT. With two control signals (CTL1 and CTL2) in this example, four configurations are possible for the configurable resistor divider network 130. The four combinations differ from each other as far as whether the resistors 112c and 112d are included in parallel with resistor 112b.

In accordance with the disclosed embodiments, upon detection of the sink device 80 (e.g., by monitoring the voltage level on the CC1 or CC2 conductors), the voltage auto-detection PD controller 120 begins a process of identifying the various voltages that the power supply 102 can produce. The voltage auto-detection PD controller 120 may perform this process by iteratively cycling through the various combinations of the CTL1 and CTL2 signals. For each combination of the CTL1 and CTL2 control signals, the voltage auto-detection PD controller 120 measures the value of its output voltage VOUT and stores the measured value (e.g., in non-volatile memory internal to or otherwise accessible to the controller). The voltage auto-detection PD controller 120 may wait for a predetermined period of time to allow the VOUT voltage to settle before making the measurement using, for example, an ADC internal to the voltage auto-detection PD controller 120. After cycling through the various combinations of CTL1 and CTL2, the voltage auto-detection PD controller 120 may advertise the measured voltages to the sink device 80 as described above. For example, the voltage auto-detection PD controller 120 may generate a plurality of packets for transmission to the sink device 80, with each packet containing a parameter indicative of a measured output voltage. In some embodiments such as with a programmable current source there may be too many voltages for the auto-detection PD controller to measure in a reasonable amount of time, and the controller in such embodiments may measure a maximum and minimum voltage, and advertise the maximum and minimum voltages to the sink device.

While the voltage auto-detection PD controller 120 is performing the VOUT learning process, the power switch 116 may be configured to be in an off state by the voltage auto-detection PD controller 120. Thus, the various voltages generated by the power supply during the aforementioned learning process are not placed on the VBUS node 110 and thus not provided to the sink device 80. The voltages that are measured by the voltage auto-detection PD controller 120 are the voltages on the VOUT node 108 with power switch 116 in an off (open) state.

In some implementations, however, the power source device 100 may be obligated to place a predetermined voltage on the VBUS node 110 within a preset amount of time upon detecting the presence of the sink device 80. For example, for the USB PD specification, the power source device 100 is to place 5V on VBUS within 475 ms of the detection of the sink device 80. Thus, for the embodiment of FIG. 2, the time required to cycle through the various CTL1 and CTL2 combinations, measure and record the VOUT voltages should be less than 475 ms according to the USB PD specification. Other embodiments for complying with this timing requirement are described below.

The embodiment of FIG. 1 also includes a load circuit 140 coupled between the VOUT node 108 and ground. The load circuit 140 in this example includes a resistor 142 coupled in series with a solid state switch 144. The gate of the solid state switch 144 functions as an enable/disable terminal for the load circuit 140. The gate of the solid state switch 144 may be driven by a discharge (DSCG1) signal from the voltage auto-detection PD controller 120. If the DSCG1 signal is in one logic state (e.g., high), switch 144 is in an on (closed) state thereby permitting current from the VOUT node 108 to flow to ground. In the opposite logic state for DSCG1, switch 144 will be in an off (open) state, thereby precluding current from flowing from the VOUT node 108 to ground. The voltage auto-detection PD controller 120 may use the DSCG1 signal to effectively apply a load to the VOUT node 108 to help stabilize the power supply output. In some embodiments, the load circuit 140 may be separate from the voltage auto-detection PD controller 120 as shown in FIG. 1, or the solid state switch 144 may be integrated into the voltage auto-detection PD controller 120. The voltage auto-detection PD controller 120 also includes a discharge signal DSCG2 which is configurable to permit current to flow from the VBUS node 110 through resistor 119 and through an internal solid state switch to ground. Thus, the voltage auto-detection PD controller 120 is configurable to apply a load to either or both of the VOUT node 108 and VBUS node 110.

Upon measuring the various VOUT voltages that the power supply 102 can generate, the voltage auto-detection PD controller 120 also may calculate upper and lower voltage limits for each measured voltage. Such voltages thus define an acceptable range for the power supply's output voltage and thus can be used to implement under and overvoltage protection. In some embodiments, the voltage auto-detection PD controller 120 computes upper and lower voltage thresholds as:

$$V_{UPPER} = V_{MEAS} * \alpha_{UPPER} + O_{UPPER}$$

$$V_{LOWER} = V_{MEAS} * \alpha_{LOWER} + O_{LOWER}$$

where $V_{UPPER}$ is the upper voltage limit, $V_{MEAS}$ is the measured voltage, $\alpha_{UPPER}$, $\alpha_{LOWER}$, $O_{UPPER}$, and $O_{LOWER}$ include the allowed supply tolerance and the allowed measurement tolerances. The $\alpha_{UPPER}$, $\alpha_{LOWER}$, $O_{UPPER}$, and $O_{LOWER}$ parameters may be determined apriori and stored in memory in the voltage auto-detection PD controller 120. For each possible VOUT voltage determined by the voltage auto-detection PD controller 120 to be producible by the power supply 102, the voltage auto-detection PD controller 120 computes a pair of upper and lower voltage thresholds and stores the computed thresholds in memory. During operation, the voltage auto-detection PD controller 120 may measure the voltage on the VBUS, compare the voltage to the thresholds for the applicable power supply voltage and respond accordingly if an over or under-voltage condition is detected (e.g., by turning off power switch 116).

In embodiments in which device 100 may be capable of functioning either to source power to another device or sink power from another device, the voltage auto-detection PD controller 120 of the power source device 100 may initialize itself into a "sink" mode in which the device 100 is configured to receive an operating voltage (rather than generate the voltage) from the other device over the cable 80. While in the sink mode, however, the voltage auto-detection PD controller 120 of the device 100 (now operating to sink power) can perform the process described above to assert the various combinations of the control signals CTL1 and CTL2 and to measure the output voltage values from its own power supply. Then, the voltage auto-detection PD controller 120 may send a USB PD message called a PR_SWAP message to the other device to advertise the measured voltages. This technique permits the device 100 to have more time to measure its various possible voltages.

In another embodiment, the voltage auto-detection PD controller 120 may measure the VOUT voltage to certain value, but round the measured value to a different value. For example, the voltage auto-detection PD controller may measure VOUT as 14.8V but round the measured value up to 15V and advertise 15V to the sink device 80 rather than the measured value of 14.8V. In such embodiments, the packets generated and communicated by the power source device 100 to the sink device 80 may include a combination of actual measured voltage values and rounded values. Either way, the voltage auto-detection PD controller 120 sends packets to the sink device 80 that contain a parameter that is indicative of the measured VOUT voltage value—the parameter is either the actual measured value or its rounded counterpart.

Figure 3:
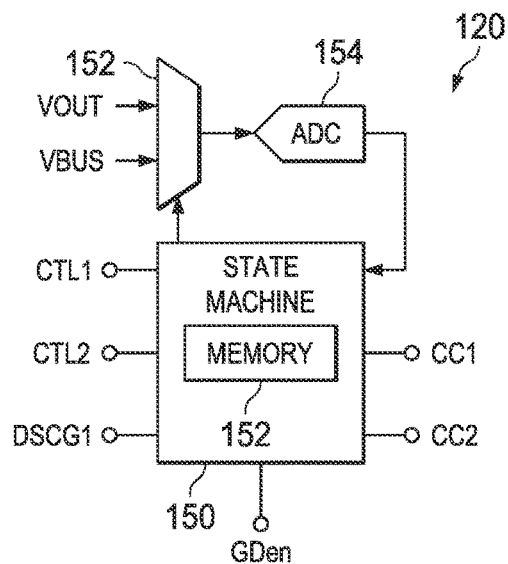
FIG. 3 shows an embodiment of the voltage auto-detection PD controller in accordance with various examples.

FIG. 3 illustrates a block diagram of at least a portion of the voltage auto-detection PD controller 120. In this example, the voltage auto-detection PD controller 120 includes a state machine 150, a voltage multiplexer 152 and an ADC 154. The ADC 154 can be used to digitize either the VOUT voltage or the VBUS voltage as selected through the multiplexer 152 by a control signal from the state machine 150. The state machine 150 may be implemented as a microcontroller executing machine instructions, a programmable logic device, or other suitable type of control circuit. The state machine 150 may include or couple to memory 152 for storage of the parameters used to compute the voltage thresholds noted above as well as store the measured values of the voltage and/or the rounded values.

Figure 4:
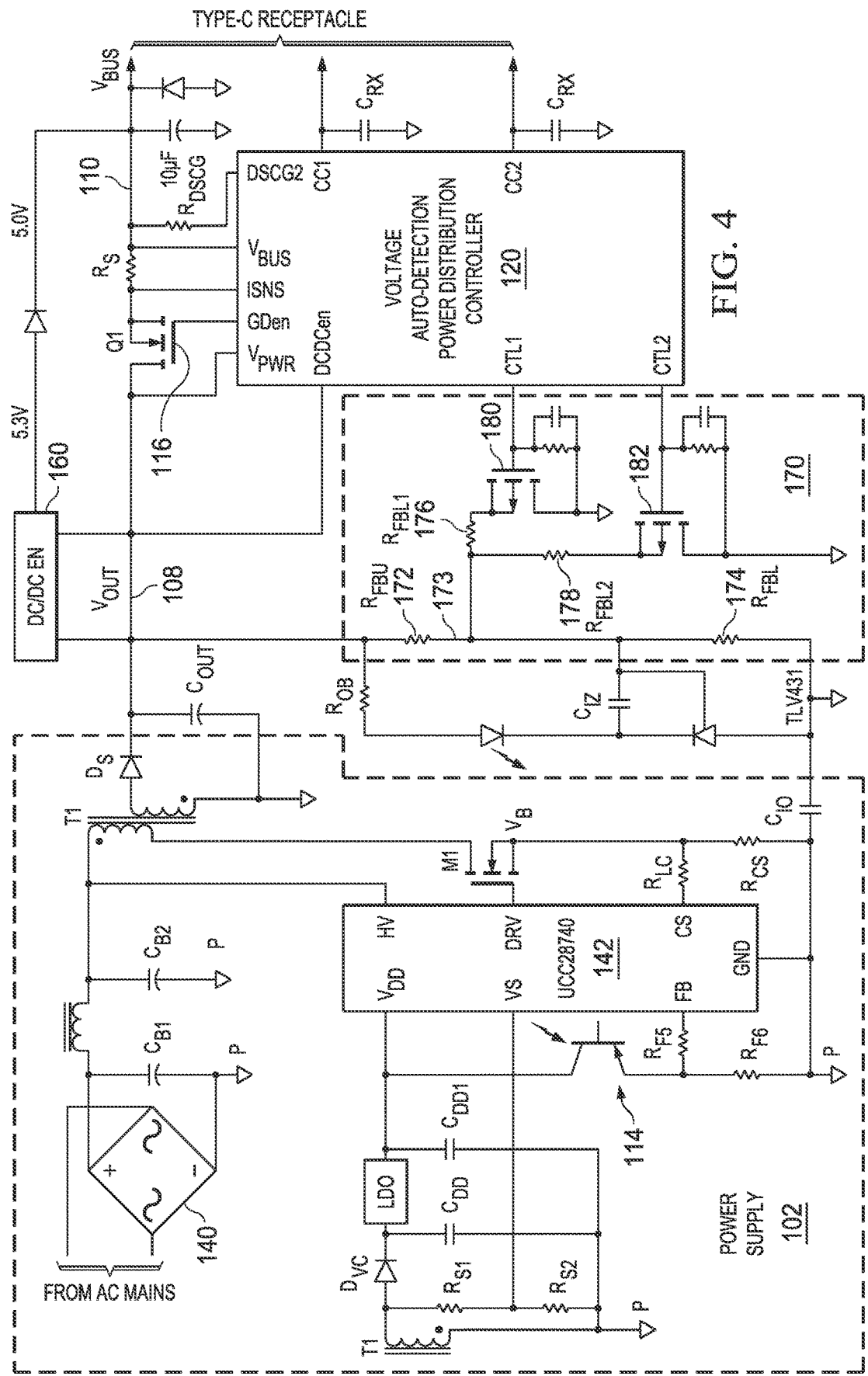
FIG. 4 shows another embodiment of the voltage auto-detection PD controller in accordance with various examples.

FIG. 4 illustrates another embodiment of the power source device 100. The power supply 102 and voltage auto-detection PD controller 120 in this embodiment are largely the same as that described above with regard to FIG. 2. Several differences, however, are present in FIG. 4 relative to FIG. 2. The configurable resistor divider network 130 of FIG. 2 has been replaced with a configurable resistor divider network 170 in FIG. 4. As for the configurable resistor divider network 130, the configurable resistor divider network 170 includes a pair of series-connected resistors 172 and 174 coupled between the VOUT node 108 and ground. Another pair of resistors 176 and 178 are connected to node 173 defined between resistors 172 and 174. Rather than connecting the opposing terminal of resistors 172 and 174 to the voltage auto-detection PD controller's CTL1 and CTL2 terminals, the resistors 172, 174 are coupled through corresponding solid state switches to ground. Resistor 176 thus connects between resistor node 173 and switch 180, while resistor 178 connects between resistor node 173 and switch 182. The CTL1 and CTL2 signals are provided to the gates of switches 180 and 182 and thus can turn the switches on and off. When a given switch 180, 182 is on, its corresponding resistor 176, 178 is coupled in parallel to resistor 174; otherwise the corresponding is left floating and thus not coupled in parallel to resistor 174.

Another difference for the embodiment of FIG. 4 relative to that of FIG. 2 is that the embodiment of FIG. 4 includes a DC-to-DC (DC/DC) converter 160. The DC/DC converter 160 is coupled between the power supply 102 and the VBUS node 110. Thus, the input DC voltage to the DC/DC converter 160 is the VOUT voltage and the output DC voltage from the DC/DC converter 160 is provided to the VBUS node 110. The output voltage from the DC/DC converter 160 may be the voltage that the power source device is to impose on the VBUS node 110 within the period of time of the corresponding specification. In the USB PD example above, the power source device 110 was to place 5V on VBUS within 475 ms. The output voltage produced by the DC/DC converter 160 thus may be 5V in this example. The DC/DC converter 160 also includes an enable/disable terminal coupled to a control terminal of the voltage auto-detection PD controller 120 (e.g., DCDCen as illustrated in FIG. 4). The DCDCen signal can be selectively asserted by the voltage auto-detection PD controller 120 to enable or disable operation of the DC/DC converter 160. In embodiments in which the process of sequencing through the various possible voltages producible by the power supply, measuring the voltages and storing them in memory takes longer than the allotted period of time by which the power supply must be configured to produce a required voltage (e.g., 5V), the voltage auto-detection PD controller 120 may enable the DC/DC converter 160 generate and/or provide its output voltage on to the VBUS node 110. The DC/DC converter 160 may be capable of generating the predetermined voltage (5V in this example) from any of the various voltages producible by the power supply 102. Thus, the acceptable input voltage range for the DC/DC converter 160 is wide enough to at least include the various voltages that the power supply 102 conceivably might produce. In some embodiments, while the DC/DC converter 160 applies a voltage to VBUS, the auto-detection PD controller 120 only advertises 5V to the sink device 80, and only offers a small amount of current. In such cases, the DC/DC converter 160 can be implemented as a relatively simple and an inexpensive circuit.

The DC/DC converter 160 can be enabled by the voltage auto-detection PD controller 120 to produce its output voltage for the VBUS node 110 and do so while power switch 116 remains off so that the voltage auto-detection PD controller 120 can continue the process of leaning the various voltages that the power supply 102 can be generate.

Figure 5:
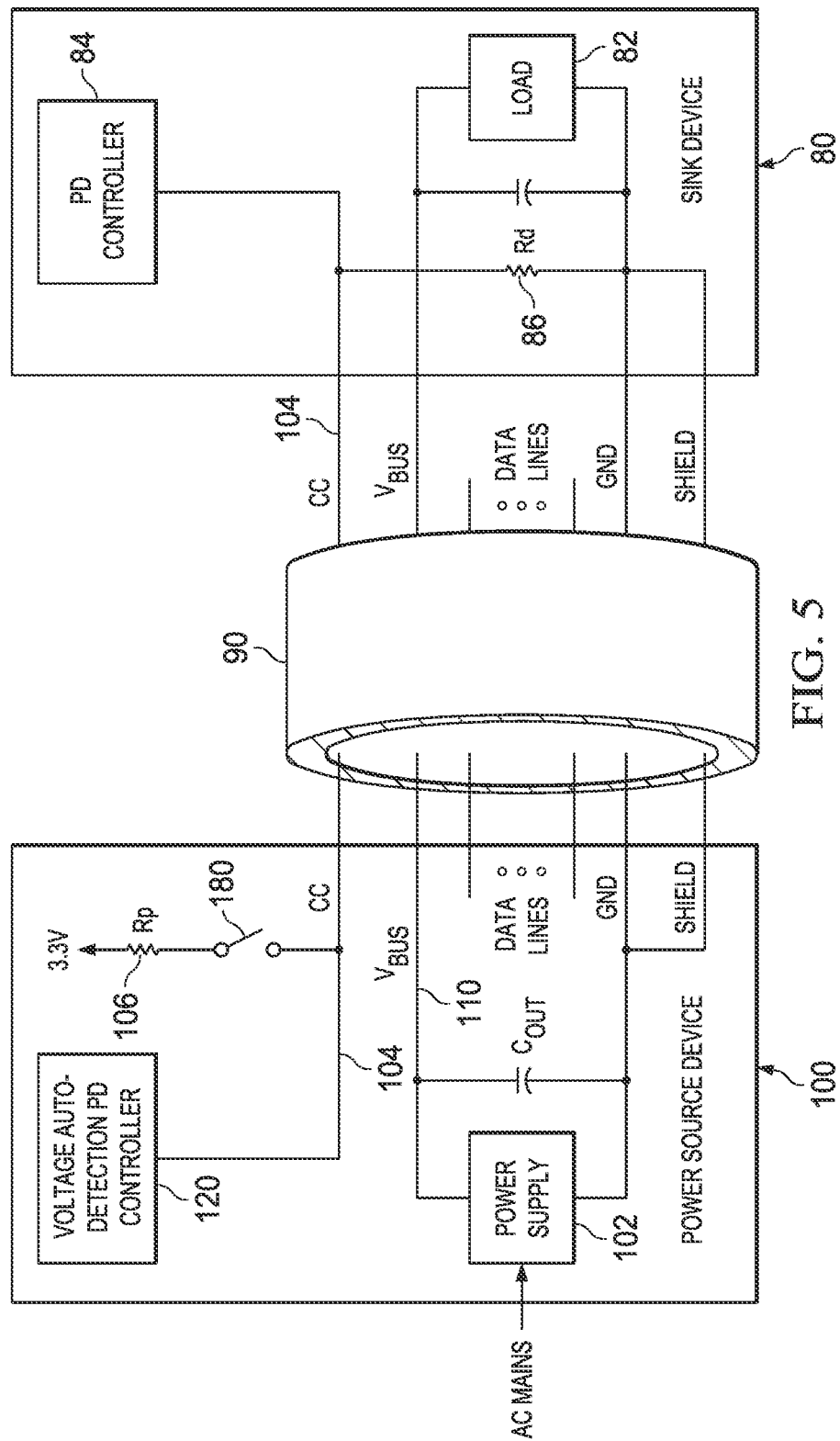
FIG. 5 illustrates an embodiment in which a pull-up resistor on a communication channel conductor can be selectively disconnected through control by the voltage auto-detection PD controller.

FIG. 5 shows an embodiment similar to that of FIG. 1. FIG. 5 illustrates a technique to provide more time for the source device's voltage auto-detection PD controller to measure and record the various voltages producible by the power supply 102. In this example, the pull-up resistor 106 may be removed from the CC conductor 104 on the source device side of the cable by turning off switch 180. The switch 180 can be controlled by a control signal from the voltage auto-detection PD controller 120. Turning off the switch 180 and effectively removing the pull-up resistor from the circuit emulates a disconnection of the sink device 80. The voltage auto-detection PD controller 120 may perform the process of learning the power supply voltages and then turn on switch 180.

Figure 6:
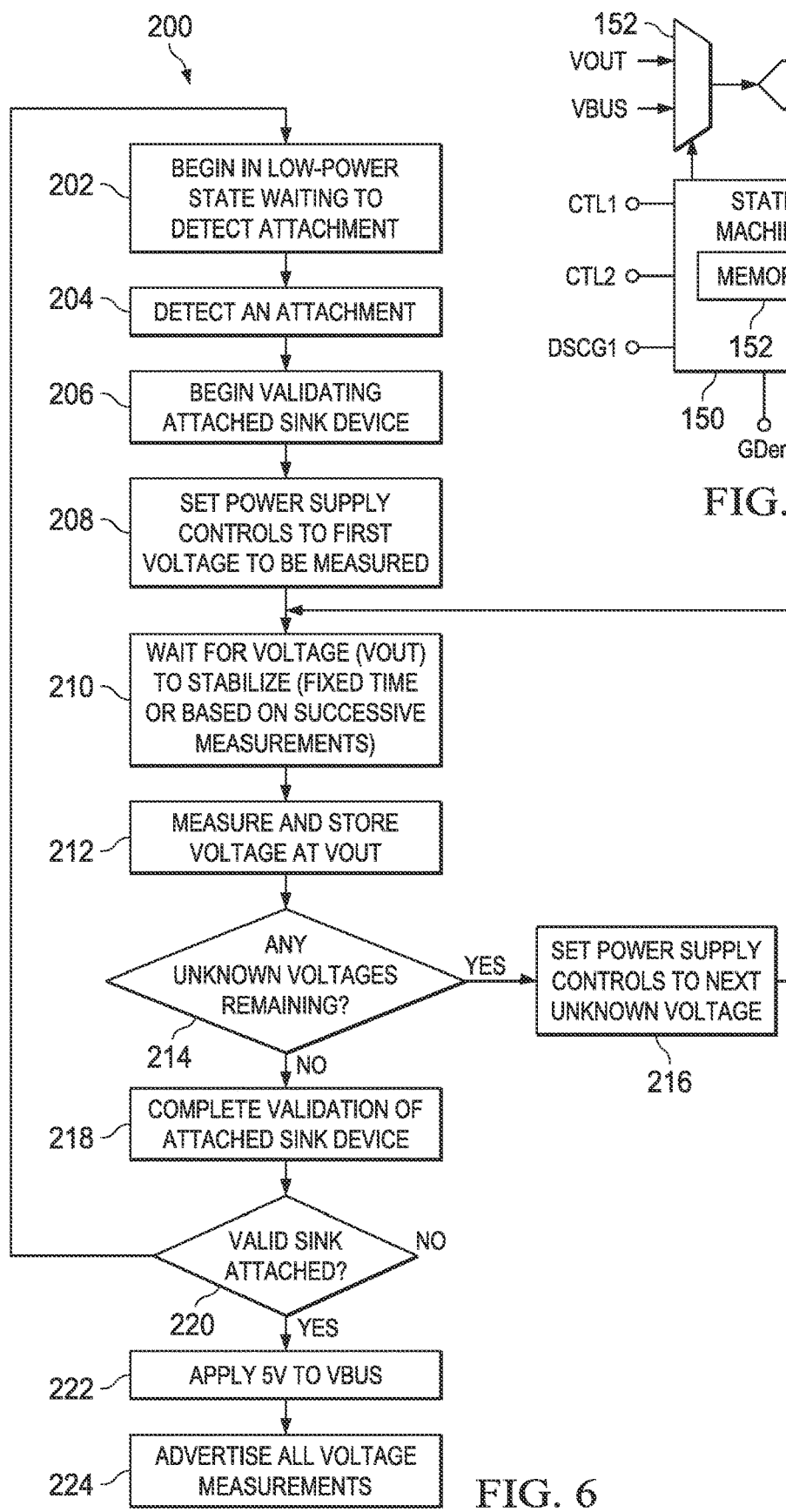
FIG. 6 shows a method in accordance with various embodiments.

FIG. 6 shows a flow chart of a method 20 in accordance with the disclosed embodiments. The operations may be performed in the order shown, or in a different order. Further, the operations may be performed sequentially or two or more of the operations may be performed concurrently.

At 202, the method includes initializing the power source device 100 into a low-power state. While in this state, the power source device (and, for example, the voltage auto-detection PD controller in particular) operates in a power supply output voltage learning mode in which at least one function performed is to wait for, and monitor, attachment of a sink device 80, and perform the rest of the operations shown in FIG. 6. In some embodiments, the voltage auto-detection PD controller 120 may perform this operation by comparing the voltage on the CC conductor (CC1 or CC2) to predetermined voltage ranges-one voltage range may be indicative of lack of attachment of a sink device 80 and another voltage range may be indicative of attachment of a sink device. At 204, the method includes detecting the attachment of a sink device.

At 206, the method begins validating the attached sink device. Validating the attached sink device may include ensuring that the voltage on the CC conductor remains between a lower threshold and an upper threshold for a predetermined period of time to guard against false alarms when a sink device is not actually attached. In some embodiments, the lower threshold is 0 volts. In one example, however, the lower and upper thresholds are 0.2V and 1.6V, respectfully, and the predetermined period of time is 150 ms. The predetermined period of time could be longer as desired as long the voltage to VBUS is enabled within the required period of time.

Operations 208-214 describe an iterative loop in which the voltage auto-detection PD controller 120 of the power source device learns the various voltages that the power supply can generate. At 208, the method includes the voltage auto-detection PD controller 120 settings to cause the power supply to generate a first output voltage (VOUT). In some embodiments, the voltage auto-detection PD controller may adjust the control signals CTL1 and CTL2 to thereby cause the power supply to generate a particular output voltage based on the optical feedback signal as described above. At 210, the method may include waiting for a particular period of time before measuring (at 212) the output voltage (VOUT) from the power supply. The period of time may help to permit the power supply's output voltage to stabilize in order for a more accurate voltage measurement to be made. In some embodiments, the period of time is fixed and configured into the voltage auto-detection PD controller 120. In other embodiments, the period of time may be based on successive measurements. That is, a series of voltage measurements may be taken in quick succession (e.g., 1 ms apart) after the power supply is configured for the output voltage, and when the measured voltage ceases to change from one such measurement to the next by more than a threshold amount (e.g., the change from one measurement to the subsequent measurement is less than a threshold percentage), the series of measurements ceases and the last measured voltage is used. At 212, the measured voltage also may be stored in, for example, internal memory of the voltage auto-detection PD controller 120. The recording may also include the configuration settings for the CTL1 and CTL2 signals that were used to cause the power supply to generate the measured voltage. Further, still the voltage auto-detection PD controller 120 also may compute the upper and lower voltage thresholds for the measured voltage (as explained in the example above) and store the computed voltage thresholds as well in memory. As such, a record is created in memory of the measured voltage for a given configuration of the CTL1/CTL2 signals as well as the corresponding upper and lower voltage thresholds. In some embodiments, the recording may be made to non-volatile memory so that the learning process need not be performed every time a sink device is attached. In other embodiments, the auto-detection PD controller 120 may store the recording until the AC main power input is removed.

At 214, the voltage auto-detection PD controller 120 determines whether any more configurations for CTL1/CTL2 remain to be used. If any such combinations remain, then at 216, the voltage auto-detection PD controller 120 controls the CTL1 and CTL2 signals accordingly and the method loops back to operation 210. In some embodiments, per the applicable specification (e.g., the USB PD specification), the power supply must be capable of generating a predetermined voltage (e.g., 5V). Since that voltage is required, the voltage auto-detection PD controller 120 need not exercise the power supply using the CTL1, CTL2 signals to measure that voltage. Instead, the voltage auto-detection PD controller 120 knows apriori that the power supply 102 is capable of generating that voltage. In some embodiments, the required voltage (e.g., 5V) may be the minimum voltage producible by the power supply and corresponds to a particular combination of CTL1 and CTL2 signals (e.g., both signals high-drains left open). That particular combination of CTL1/CTL2 signals may be omitted if desired during the power supply output voltage learning process. In some embodiments, multiple voltages may be implemented that may have predetermined CTL1, CTL2 signals known to produce them.

If the voltage auto-detection PD controller 120 has exercised the power supply 102 through all relevant combinations of the CTL1 and CTL2 signals, then at 218, the method comprise completing the validation of the attached sink device 80 as explained above. To complete the sink validation process, the CC voltage should have stayed between the thresholds for a certain amount of time, which may be a relatively long compared to the time used in 206. A timer can be started in 206, and if more time is needed to ensure the CC voltage has stabilized, the timer may be extended in 218. The intervening operations 208-216 may be performed during the predetermined time period during which the attached sink device is being validated. If no valid sink device is attached (as determined at 220), then the process loops back to 202 and the process may repeat. If, however, a valid sink device is attached, then the power supply 120 is configured (via the appropriate combination of the CTL1 and CTL2 signals) to generate a predetermined output voltage (e.g., 5V) and the power switch 116 is turned on by the voltage auto-detection PD controller 120 to provide the predetermined voltage to the VBUS node 110. The power switch is turned on via a control signal from the voltage auto-detection PD controller 120 as explained above.

At 224, the voltage auto-detection PD controller 120 generates and transmits packets to the sink device to advertise the various voltages determined to be producible by the power supply. As noted above, the advertisements may include the actual voltages that were measured or rounded versions of the measured voltages.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless (e.g., optical) connection. Thus, if a first device couples to a second device, that connection may be through a direct connection or through an indirect connection via other devices and connections. The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A universal serial bus (USB) source device adapted to be coupled to a USB sink device via a USB cable, the USB source device comprising:
   a voltage bus (VBUS) terminal adapted to be coupled to a VBUS conductor of the USB cable;
   a configuration channel (CC) terminal adapted to be coupled to a CC conductor of the USB cable;
   a VOUT node coupled to the VBUS terminal and adapted to be coupled to a voltage supply;
   a controller circuit coupled to the VBUS terminal, the CC terminal and the VOUT node;
   a load circuit coupled to a discharge signal connection of the controller circuit and to the VOUT node; and
   a resistor divider coupled to the VOUT node and the controller circuit and adapted to be coupled to the voltage supply.

2. The USB source of claim 1, wherein the controller circuit is configured to determine supply capabilities of the voltage supply before communicating the supply capabilities to the USB sink device via the USB cable.

3. The USB source of claim 2, wherein the supply capabilities includes a voltage level of at least one of 5V, 9V, 15V, or 20V.

4. The USB source of claim 1, wherein the load circuit includes:
   a resistor having a first terminal and a second terminal, the first terminal of the resistor coupled to the VOUT node; and a transistor having a control terminal coupled to the controller circuit, a first current terminal coupled to the second terminal of the resistor and a second current terminal coupled to ground.

5. The USB source of claim 1, wherein the resistor divider includes:
- a first resistor having a first terminal and a second terminal, the second terminal of the first resistor coupled to the controller circuit;
- a second resistor having a third terminal and a fourth terminal, the third terminal is coupled to the first terminal and the fourth terminal is coupled to the controller circuit;
- a third resistor having a fifth terminal coupled to the VOUT node and a sixth terminal coupled to the first terminal; and
- a fourth resistor having a seventh terminal coupled to the first terminal and an eighth terminal adapted to be coupled to the voltage supply.

6. The USB source of claim 1, wherein the controller circuit is configured to detect the USB sink device via the CC terminal, and configured to transmit a data packet to the USB sink device via the CC terminal.

7. The USB source of claim 1, wherein the controller circuit is configured to detect the USB sink device via the CC terminal, and configured to couple the VBUS terminal to the voltage supply after the power sink device is detected.

8. A universal serial bus (USB) source device adapted to be coupled to a USB sink device via a USB cable, the USB source device comprising:
- a voltage bus (VBUS) terminal adapted to be coupled to a VBUS conductor of the USB cable;
- a configuration channel (CC) terminal adapted to be coupled to a CC conductor of the USB cable;
- a VOUT node coupled to the VBUS terminal and adapted to be coupled to a voltage supply;
- a controller circuit coupled to the VBUS terminal, the CC terminal and the VOUT node;
- a DC-to-DC (DC/DC) converter having a first input coupled to the VOUT node, a second input coupled to the controller circuit and an output coupled to the VBUS terminal; and
- a resistor divider coupled to the VOUT node and the controller circuit and adapted to be coupled to the voltage supply.

9. The USB source of claim 8, wherein the controller circuit is configured to determine supply capabilities of the voltage supply before communicating the supply capabilities to the USB sink device via the USB cable.

10. The USB source of claim 9, wherein the supply capabilities includes a voltage level of at least one of 5V, 9V, 15V, or 20V.

11. The USB source of claim 8, wherein the resistor divider includes:
- a first transistor having a first control terminal coupled to the controller circuit, a first current terminal and a second current terminal;
- a second transistor having a second control terminal coupled to the controller circuit, a third current terminal and a fourth current terminal;
- a first resistor having a first terminal and a second terminal, the first terminal of the first resistor coupled to the VOUT node;
- a second resistor having a third terminal and a fourth terminal, the third terminal is coupled to the second terminal of the first resistor and the fourth terminal is coupled to the first current terminal;
- a third resistor having a fifth terminal coupled to the second terminal of the first resistor and a sixth terminal coupled to the third current terminal; and
- a fourth resistor having a seventh terminal coupled to the second terminal of the first resistor and an eighth terminal adapted to be coupled to the voltage supply.

12. The USB source of claim 8, wherein the controller circuit is configured to detect the USB sink device via the CC terminal, and configured to transmit a data packet to the USB sink device via the CC terminal.

13. The USB source of claim 8, wherein the controller circuit is configured to detect the USB sink device via the CC terminal, and configured to couple the VBUS terminal to the voltage supply after the power sink device is detected.

* * * * *